Aug. 31, 1954 H. E. MALONE 2,687,610
THERMOSTAT
Filed March 5, 1951 2 Sheets-Sheet 1
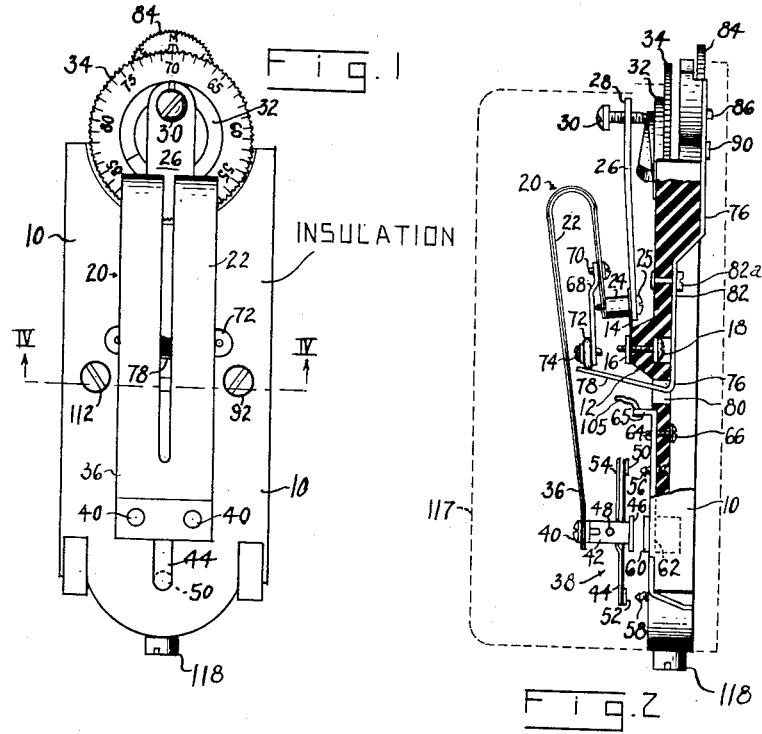
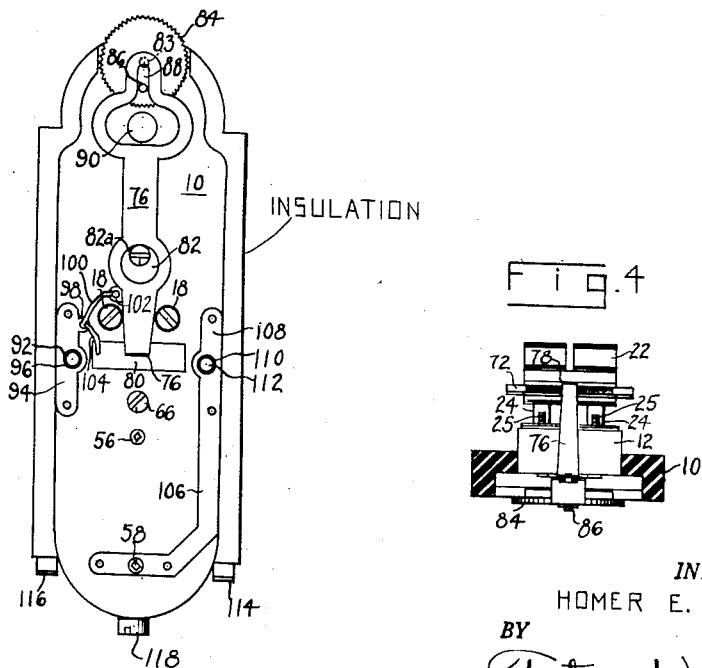
INVENTOR.
HOMER E. MALONE
BY
Tate & Weikart
ATTORNEYS Aug. 31, 1954
H. E. MALONE
2,687,610
THERMOSTAT
Filed March 5, 1951
2 Sheets-Sheet 2
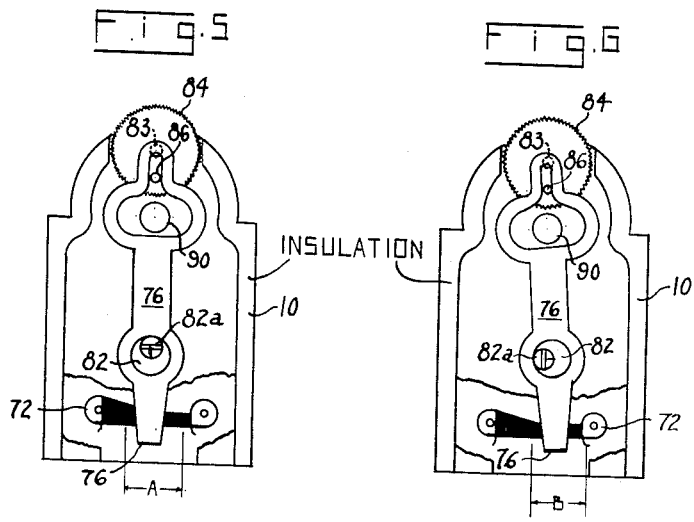
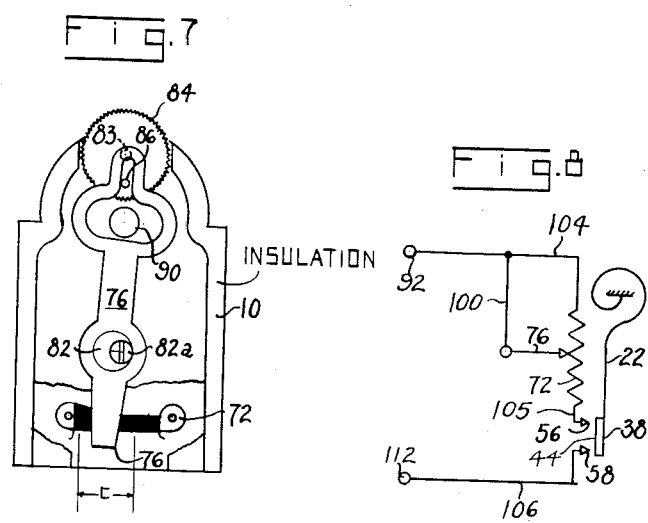
INVENTOR.
HOMER E. MALONE
BY
Tate & Weikart
ATTORNEYS Patented Aug. 31, 1954

2,687,610

UNITED STATES PATENT OFFICE 2,687,610

THERMOSTAT

Homer E. Malone, Milwaukee, Wis., assignor to Perfex Corporation, Milwaukee, Wis., a corporation of Wisconsin Application March 5, 1951, Serial No. 213,827

10 Claims. (Cl. 60—23)

This invention relates to a condition responsive device, and more particularly to a switch responsive to variations in the temperature of a room or other enclosure.

Thermostats are often provided with an auxiliary or anticipating heater which anticipates the rise in ambient temperature caused by operation of the heating means controlled by the thermostat. In general, depending on the ability of the heating system to store thermal energy, better temperature control can be attained by causing the operating periods of the heating means to be as short as possible, proper starting and operating time for the heating means being a limiting factor. Thus frequent, short operating periods of the heating means produce a more constant temperature than long, but infrequent, operating periods. The simplest and most direct way to meet the requirement for relatively short heating means operating periods or burner operating periods is to so construct the controlling thermostat that it quickly anticipates a change in the controlled termperature. This can be done by providing an auxiliary heater for the thermostat bimetal which will rapidly heat the bimetal to the temperature at which it opens the thermostat contacts, the time required for such heating being of the order of two or three minutes. The provision of means for rapidly heating the bimetal to open the thermostat contacts by utilizing a heater emitting a relatively large amount of heat, however, produces side effects which are disadvantageous. Any thermostat to which auxiliary heat is added is subject to load error or droop, which is the error introduced by the variation of the control point with changes in load. Thus, when the load on the heating system is large, caused by, for example, extremely low outdoor temperatures, the resulting frequent closures of the thermostat and frequent heating of the thermostat bimetal by the auxiliary heater raises slightly the mean temperature of the bimetal and surrounding parts, since the time between the intervals in which the auxiliary heater is effective is so short that all of the heat introduced to the bimetal in a single heating period is not dissipated by the beginning of the next heating period. This causes the thermostat to control the temperature ambient to the thermostat or the room temperature, at an average room temperature lower than the pre-set control point temperature. The operation of the thermostat no longer reflects only the temperature of the room, a temperature gradient exists between the thermostat bimetal and the room air, the thermostat bimetal being at a mean temperature artificially above the temperature of the room air. This depression of the control point under heavy load conditions caused by the thermostat bimetal being held at a temperature higher than the ambient or room temperature can be minimized by designing the thermostat so that the heat introduced into the thermostat by the auxiliary heater may be rapidly dissipated and not retained by the bimetal, heater mounting, and surrounding parts. It will thus be seen that the optimum design for a thermostat employing an auxiliary or anticipating heater is one in which the auxiliary heater emits sufficient heat to produce relatively short operating periods of the heating means and yet does not retain the heat introduced into the thermostat by the auxiliary heater.

The various heating means commonly used in domestic heating installations, such as gas furnaces, gas fired floor-furnaces, high pressure oil burners and pot-type oil burners, each have a minimum operating period for obtaining proper combustion efficiency. For gas-fired floor furnaces this minimum period is rather short, for pot-type oil burners it is much longer. Thus, though it is generally advantageous to have short operating periods, as pointed out above, the brevity of these operating periods is limited by the combustion efficiency requirement of the particular heating means being controlled. Additionally the optimum operating period for the heating means in any heating installation is a function of the magnitude of the heat losses from the room or enclosure being heated, also of the type of heat transfer medium being used. It will thus be seen that a thermostat which will be suitable for general use should have a readily accessible means for adjusting the length of the operating periods of the heating means being controlled.

A further complication occurs because of the fact that thermostats are not always sold only with the various controls (gas valves, oil burner primary controls, etc.) which they are intended to operate. Many thermostats are sold as replacements of faulty or older, less accurate units. To achieve accurate temperature control, as pointed out above, the thermostat must have artificial heat applied to it from a heater the electrical current for which is, most conveniently, taken from the thermostat circuit itself, furthermore, as pointed out above, the heat produced by the heater must be of a definite magnitude, adjustably variable within a small range to produce accurately timed on-periods of the heating means or furnace. Since the current in the control circuit into which the thermostat is to be integrated is not standard but varies with the requirements of the other control circuit components (such as gas valves, oil burner controls, etc.) and since different manufacturers of these other control circuit components have differing current requirements for the same type of component, it will be apparent that a thermostat suitable for general use, including replacement service must have some means for retaining the same range of available artificial heat even though it is integrated into control circuits which carry various control circuit currents.

In the past an attempt has been made to meet this difficulty by providing thermostats in which the heater producing the artificial heat is removable so that the proper heater, matching the current in the control circuit into which the thermostat is to be integrated, can be inserted when the installation is being made. Such an arrangement requires that, in order that the thermostat can be generally useable in various installations and as a replacement unit, a large and varied stock of heaters must be maintained by the seller of the equipment and that the heating equipment serviceman must carry with him a representative group of these resistance heaters for insertion into the thermostat at its installation, the type of heater to be used depending on the particular requirements of the job. The difficulty and inconvenience in this arrangement is, of course, obvious.

An object of the present invention is to provide a thermostat, using artificial heat, which is universally adaptable to various control circuits of a differing current requirements, such adaptability being attained by a simple manual adjustment without the removal and insertion of various heaters into the thermostat.

Another object of the present invention is to provide a thermostat which is adaptable to various heating installations, having means for adjusting the length of the operating periods of the heating means being controlled.

This application is a continuation-in-part of my co-pending application Serial Number 200,994, filed December 15, 1950.

These and other objects of this invention will become apparent from the following description and the appended claims.

For a full disclosure of the invention, reference is made to the following detailed description and the accompanying drawing, in which:

Fig. 1 is a front view of the thermostat embodying the invention, the cover being removed;

Fig. 2 is a side view of the thermostat, the cover being shown in broken lines;

Fig. 3 is a rear view of the thermostat;

Fig. 4 is a sectional view taken along the lines IV—IV of Fig. 1;

Fig. 5 is a rear view of a portion of the thermostat with parts in one positional adjustment;

Fig. 6 is a rear view of a portion of the thermostat with parts in another positional adjustment;

Fig. 7 is a rear view of a portion of the thermostat with parts in still another positional adjustment;

Fig. 8 is a schematic diagram of the thermostat circuit.

The thermostat parts are shown mounted on a base 10 of Bakelite or similar insulation material adapted for mounting upon the wall of a room. The base 10 is formed with a raised portion or boss 12 which supports a spring hinge 14 fastened thereto by means of a retaining strip 16 and screws 18 (Fig. 2). The spring hinge 14 pivotally supports a thermostatic assembly 20. The thermally active portion of the assembly 20, which is the bimetal strip 22, comprises curved strips of dissimilar metals joined together and secured at one end to the hinge 14 by means of spacers 24 and screws 25. An adjusting arm 26, for varying the position of assembly 20, is also secured to the hinge 14 by screws 25. An opening in the free end 28 of arm 26 is threaded to receive a calibrating screw 30. The arm 26 and screw 30 are biased by the spring hinge 14 to bear against the surface of a rotatable cam 32. The cam 32 is assembled as a unit with a cam positional adjustment member shown to be a temperature range control dial 34. The cam 32 and dial 34 are rigidly secured to a pin 90 (Fig. 3) which extends freely through a hole in the base 10, the cam and dial thus being manually rotatable about an axis perpendicular to the plane of the base 10. The manual setting of range control dial 34 varies the height of the cam surface under the screw 30 thereby moving arm 26 to vary the position of the assembly 20 and the control point of operation of the thermostat.

The free end 36 of bimetal 22 is secured to a contact bridge assembly 38 by means of screws 40. The contact bridge assembly 38 consists of a U-shaped bracket 42 secured to the bimetal end 36, a contact bridge 44, secured at an intermediate point to bracket 42, and an armature 46, secured to the bracket 42. The contact bridge 44 is of the bridging type, as described in U. S. Patent 2,250,135 issued to H. E. Lindemann, and carries contacts 50 and 52. A bracket 54 of bridge 44 has two up-turned ears (not shown) through which pin 48 extends, the structure 44 being freely pivotable about the pin 48. The contacts 50 and 52 are positioned adjacent to a pair of fixed contacts 56 and 58, respectively.

A permanent magnet 60 is held firmly in a recess in base 10 by means of an extension 62 of conductor strip 64. The magnet 60 is positioned in proximity to the armature 46 to provide a magnetic attraction for contact closing of the contact bridge assembly 38 to insure a snap-action. The conductor strip 64 is secured in a recess in base 10 by means of a screw 66. The strip 64 has a threaded aperture which receives the contact 56 to provide a conducting path for the thermostat circuit to be later described.

A bracket 68, preferably of aluminum or metal having comparable heat conducting properties, is fastened to the bimetal 22 by means of screws 70. The other end of brackets 68 supports a wire-wound heater 72, held by means of screws 74. The heater 72 has exposed windings in juxtaposition to an extension portion 78 of a wiper arm 76. The wiper arm 76 is formed of a good electrical conductive metal and serves, because of its variable position as will be subsequently pointed out, to vary the effective resistance and therefore heat output of heater 72. The arm 76 extends freely through an aperture 80 in base 10 and is then bent at a right angle to lie along the rear face of base 10. Arm 76 is pivotally mounted on an eccentric cam 82, which, in turn, is rigidly fastened to a shaft extending through the base 10 and having a slotted head 82a. A portion of arm 76 is offset and extends along the rear face of base 10 to a point opposite a pin 83

(Fig. 3). The pin 83 is journalled in the base 10 and pivotally supports an adjusting dial 84. A projecting pin 86 is firmly secured to the dial 84 and projects through a slotted portion 88 in the upper end of arm 76. It will be seen that manual rotation of dial 84, through the eccentrically mounted pin 86, pivotally moves arm 76 about its pivot 82. This movement results in a wiping action of extension portion 78 of wiper arm 76 across the exposed windings of heater 72. Further, it will be seen that rotation of the head 82a will change the lateral position of the lobe of cam 82 and consequently the lateral position of the pivot point of the arm 76.

The various electrical connections will now be described. A screw 92 extends loosely through an opening 96 in a bracket 94 (Fig. 3) which is riveted to the base 10. As may be seen in Fig. 1, an opening in the base 10, somewhat smaller than the head of screw 92, permits the screw 92 to be accessible from the front of the base 10. The terminal 94 has an ear extension 98 to which is attached by soldering or other suitable means an electrical conductor 100. The other end of conductor 100 is fastened to an ear 102 projecting from wiper arm 76. A wire 104 (Figs. 3 and 8) is soldered to the ear 98, extends through the opening 80 to the upper surface of base 10, and is electrically connected to one end of the heater 72.

A conductor 105 (Figs. 2 and 8) connects the other side of heater 72 with the ear 65 formed at the end of conductor strip 64. Ear 65 is electrically integral with fixed contact 56. The other fixed contact 58 is threaded into a terminal plate 106 (Fig. 3) riveted to the rear surface of base 10. The terminal plate 106 has an offset extension 108 which has an opening 110 through which a screw 112 extends as described with reference to the screw 92.

The screws 92 and 112 may be attached to an external circuit for controlling a heating means for maintaining the temperature of a room or other enclosure. The heater circuit extends, as shown in Fig. 8, from screw 92, through terminal ear 98, through wire 104 to the heater 72. The circuit continues through heater 72, wire 105, ear 65, conductor strip 64, contact 56, bridge 44, contact 58, terminal plate 106, and screw 112. The wire 100 and wiper arm 76 serve to short out a variable portion of heater 72 depending on the position of wiper arm 76.

The screws 92 and 112 serve a dual function. They are utilized both as electrical connectors for external circuit connections and as mechanical fasteners to retain the thermostat against a wall mounting bracket (not shown).

The spring members 114 and 116 (Fig. 3), riveted to the base 10, serve to retain the thermostat within the cover 117. The screw 118 securely holds the thermostat assembly within the cover 117 (Fig. 2).

Operation

With the thermostat installed and connected into the control circuit for a heating means, such as a gas-fired furnace, etc., the dial 34 may be manually set to the temperature at which it is desired to hold the temperature of the room or enclosure. The dial 84 may be set to provide the auxiliary heater setting which will result in operating periods for the heating means which will give the best temperature control for the particular installation. Should the room temperature then fall below the temperature setting of dial 34, the thermostat contacts will be closed energizing the heating means being controlled and also auxiliary heater 72. The portion of heater 72 which will be energized will depend upon the position of arm 78 which in turn depends upon the position of dial 84. As soon as the temperature of the bimetal element 22 is raised sufficiently because of the rising room temperature and the heat emitted from the heater 72, the thermostat contacts will be opened shutting down the heating means.

It will be noted that the auxiliary heater 72 is mounted on the bracket 68, formed of a metal having good heat conducting properties, and the heat produced by heater 72 can thus rapidly move to the bimetal by conduction through the bracket 68. The flat thin shape of bracket 68, giving a relatively small mass to surface area ratio results in a high rate of heat dissipation by radiation and convection when the heater 72 is de-energized. Additionally, the heater 72 is located well within the bight of the U-shaped bimetal element 22 which facilitates the transfer of heat from the heater 72 to the bimetal by convection as well as by radiation and conduction. Further, the heater adjustment mechanism is located on the opposite side of the base 10 from the heater 72 and bimetal 22 so that this mechanism does not form a heat retaining mass adjacent the heater 22 thereby lowering the heat dissipating or cooling rate of the heater and bimetal when the thermostat contacts are opened. The construction described thus provides a thermostat in which the auxiliary heater rapidly affects the contact-actuating element and yet rapidly dissipates the heat provided by the auxiliary heater when the thermostat contacts are opened and the adjusting mechanism for the auxiliary heater is located relatively remote from the auxiliary heater and contact-actuating element.

The features and operation of the present invention which, when embodied in a thermostat, make it useable with various control circuits having differing control circuit currents will now be more fully described.

In Figs. 5, 6 and 7 there is illustrated three of the positions into which the cam 82 may be placed by rotation of the head 82a. With cam 82 in the position shown in Fig. 6, the pivot point of arm 76 will be laterally shifted to its furthest right hand position. With cam 82 in this position, rotation of dial 84 will cause the wiper arm 78 to traverse a segment of the resistance heater 72 indicated at "B" in Fig. 6. Similarly with cam 82 in the position shown in Figs. 5 and 7 the arm 78 will be made to traverse segments "A" and "C" respectively.

Since only that portion of the resistance heater 72 is energized which is on the right hand side of wiper arm 78, it will be apparent that Fig. 6 illustrates the proper position for cam 82 when the thermostat is to be integrated into a control circuit carrying a relatively high current, since the current passing through the heater will then be relatively high and therefore only a relatively small amount of resistance will be necessary to produce the required amount of heat for proper cycling of the thermostat. Similarly Fig. 5 illustrates a setting of cam 82 for a control circuit carrying a current of an intermediate value, and Fig. 7 illustrates the setting for a control circuit carrying a relatively small current. The maximum amount of resistance heater 72 will be energized when cam 82 is in the position shown in Fig. 7, since the current through heater 72 will then be relatively small and a greater amount of resistance is necessary to produce the required amount of heat for proper cycling of the thermostat. Suitable reference markings may, of course, be made adjacent the head 82a to identify the various high current and low current positions for the cam 82.

It will be recalled that, as previously pointed out, the proper cycling of the thermostat depends upon the amount of artificial heat affecting the bimetal element 22 and that the amount of such heat is adjustable, through a narrow range, by rotation of the dial 84. The amount and range of variation of this artificial heat must be independent of the current passing through the energized portion of resistance heater 72 if the thermostat is to be usable in circuits carrying differing currents. Since the heat produced by a resistance heater is a function of $I^2R$, where I is the current passing through the heater and R is the resistance of the heater, and since the amount and range of adjustment of the heat produced by the energized portion of heater 72 must be a constant for all positions of cam 82, a relationship may be written as:

(1) $\qquad I^2(R-r)=K$ where I is the current passing through heater 72, R is the resistance of heater 72 when wiper arm 78 is in its furthest left hand position in Figs. 5, 6, or 7, and $r$ is the resistance of heater 72 when wiper arm 78 is in its corresponding furthest right hand position, and K is a constant. This relationship may be rewritten as:

$$I^2=\frac{K}{R-r}$$

From relationship (2) it will be apparent that as I varies, the quantity $(R-r)$, representing the range of adjustment of resistance heater 72, must also vary exponentially. Since, for any setting of cam 82, only a small amount of linear motion of wiper arm 78 is available for adjusting the resistance of heater 72, such small amount of linear motion must be made to vary the resistance heater 72 exponentially as dial 84 is rotated. This is done by shaping the bobbin on which heater 72 is wound so as to approximate an exponential curve (Figs. 5, 6 and 7). Thus when cam 82 is set in minimum current position (Fig. 7), movement of arm 78 through the range "C" will produce a relatively large variation in the resistance of heater 72 (because of the increased length of the windings at this range) and will produce the required variation in the heat produced by heater 72. When cam 82 is set in maximum current position (Fig. 6), movement of arm 78 through range "B" will produce a much smaller variation in the resistance of heater 72, but will still produce the required variation in the heat produced by heater 72. Thus, the shape of the bobbin on which heater 72 is wound permits the linear movement through ranges "A," "B," and "C" to produce the same variation in heat produced by heater 72, even though the current through heater 72 may vary depending on the type of control circuit into which the thermostat is integrated.

From the foregoing it will be seen that a serviceman, upon installation of the thermostat, after noting the rated current of the control circuit into which the thermostat is to be connected, may adjust cam 82 to the position corresponding to the rated current and complete the installation with the assurance that after adjustment of dial 84 proper cycling of the thermostat will take place.

Modifications of this invention may occur to those skilled in the art. Its scope is to be determined by the appended claims.

What is claimed is:

1. A control device comprising a base, a thermally responsive element mounted on the base, an electric heater mounted adjacent the element for modifying the response thereof, means for adjusting through a range of adjustment the resistance and therefore the thermal output of said heater for a given heater current value, and a separate manually moveable member for shifting the range of adjustment of said resistance to maintain a uniform thermal output of said heater for other heater current values.

2. A control device comprising a base, a thermally responsive element mounted on the base, an electric heater mounted adjacent the element for modifying the response thereof, adjusting means for adjusting through a range of adjustment the resistance and therefore the thermal output of the heater for a given heater current value, said adjusting means including a pivotally moveable arm cooperating with the heater, a member manually moveable to displace the pivot for said arm for shifting the range of adjustment of said resistance to maintain a uniform thermal output of said heater for other heater current values.

3. A thermostat comprising a base, a thermally responsive element mounted on the front side of the base, an electric heater mounted adjacent the element for modifying the response thereof, adjusting means for adjusting through a range of adjustment the resistance and therefore the thermal output of the heater for a given heater current value, said adjusting means including an arm pivotally mounted on the rear face of said base and having a portion extending to the front side of the base cooperating with the heater, and an eccentrically mounted cam manually moveable to displace the pivot for said arm to shift the range of adjustment of said resistance and maintain a uniform thermal output of said heater for other heater current values.

4. A control device comprising a base, a thermally responsive element mounted on the base, a wire-wound electric heater mounted adjacent the element for modifying the response thereof, means for adjusting through a range of adjustment the resistance and therefore the thermal output of said heater for a given heater current value, said last named means including a pivotally moveable wiper arm for said heater adapted to be pivotally moved within its limits of movement and thereby traverse a sector of said heater, and a manually moveable member for laterally displacing the pivot for said arm to shift along said heater the sector traversed by said arm.

5. A control device comprising a base, a thermally responsive element mounted on the base, an electric heater mounted adjacent the element for modifying the response thereof, an arm adjustably moveable for varying through a range of adjustment the quantity of heat transmitted from the heater to the element for a given heater current value, means for so moving the arm and a manually moveable member for relatively shifting the arm with respect to said last-mentioned means for modifying the adjustable movement of said arm to maintain uniform the quantity and range of adjustment of heat transmitted from said heater to said element for other heater current values.

6. A control device comprising a base, a thermally responsive element mounted on the base, an electric heater mounted adjacent the element for modifying the response thereof, an arm pivotally mounted on the base and adjustably moveable about its pivot for varying through a range of adjustment the quantity of heat transmitted from the heater to the element for a given heater current value, and a manually moveable member adapted to displace the pivot for said arm for modifying the adjustable movement of said arm to maintain uniform the quantity and range of adjustment of heat transmitted from said heater to said element for other heater current values.

7. A thermostat including a base, an elongated bimetal element having one of its ends mounted on one side of the base, an electric heater mounted adjacent the element for modifying the temperature ambient to said element, adjusting means for adjusting through a range of adjustment the resistance and therefore the thermal output of the heater for a given heater current value, said adjusting means including an arm pivotally mounted on the other side of the base and having a portion extending to said one side of the base for cooperation with the heater, and a manually movable member for displacing the pivot for said arm to shift the range of adjustment of said resistance and maintain a uniform thermal output of said heater for other heater current values, said last named means including a member accessible from said other side of the base.

8. A control device comprising a base, a thermally responsive element mounted on the base, an electric heater mounted adjacent the element for modifying the temperature ambient to said element, the electrical resistance of said heater increasing exponentially from a minimum to a maximum value along the length of the heater, means for adjusting through a range of adjustment a fractional part only of the resistance of said heater to control the thermal output of said heater for a given heater current value, and a manually moveable member for selectively placing in operative relation to said adjusting means either that fractional portion of said heater having minimum electrical resistance or that fractional portion of said heater having maximum electrical resistance thereby shifting the range of adjustment of said resistance to maintain a uniform thermal output of said heater for maximum and minimum heater current values respectively.

9. A control device comprising a base, a thermally responsive element mounted on one side of the base, an electric heater mounted adjacent the element for modifying the temperature ambient to said element, the electrical resistance of said heater increasing exponentially from a minimum to a maximum value along the length of the heater, adjusting means for adjusting through a range of adjustment the resistance and therefore the thermal output of the heater for a given heater current value, said adjusting means including an arm pivotally mounted on the other side of the base, and having a portion extending to said one side of the base for cooperation with the heater, and a manually moveable member accessible from said other side of the base for selectively shifting the range of adjustment of said resistance from the portion of said heater having minimum electrical resistance to the portion of said heater having maximum electrical resistance to maintain a uniform thermal output of said heater for maximum and minimum heater current values respectively.

10. A control device comprising a base, a U-shaped bimetal element having one end mounted on one side of the base, an electric heater mounted within the bight of said U-shaped element for modifying the temperature ambient to said element, the electrical resistance of said heater increasing exponentially from a minimum to a maximum value along the length of the heater, adjusting means for adjusting through a range of adjustment the resistance and therefore the thermal output of the heater for a given heater current value, said adjusting means including an arm pivotally mounted on the other side of the base and having a portion extending to said one side of the base for cooperation with the heater, and a manually moveable member accessible from said other side of the base for selectively shifting the range of adjustment of said resistance from the portion of said heater having minimum electrical resistance to the portion of said heater having maximum electrical resistance to maintain a uniform thermal output of said heater for maximum and minimum heater current values respectively.

References Cited in the file of this patent

UNITED STATES PATENTS

| Number | Name | Date |
|---|---|---|
| 1,496,745 | Scott | June 3, 1924 |
| 1,564,804 | Warren | Dec. 8, 1925 |
| 1,940,102 | Roberton | Dec. 19, 1932 |
| 2,073,326 | Taylor | Mar. 9, 1937 |
| 2,092,327 | Persons | Sept. 7, 1937 |
| 2,366,968 | Kaufmann | Jan. 9, 1945 |
| 2,375,234 | Malone et al. | May 8, 1945 |
| 2,572,162 | Koonz | Oct. 23, 1951 |